United States Patent
Kadav et al.

(10) Patent No.: US 10,796,169 B2
(45) Date of Patent: Oct. 6, 2020

(54) PRUNING FILTERS FOR EFFICIENT CONVOLUTIONAL NEURAL NETWORKS FOR IMAGE RECOGNITION OF ENVIRONMENTAL HAZARDS

(71) Applicant: NEC Laboratories America, Inc., Princeton, NJ (US)

(72) Inventors: Asim Kadav, Jersey City, NJ (US); Igor Durdanovic, Lawrenceville, NJ (US); Hans Peter Graf, South Amboy, NJ (US)

(73) Assignee: NEC Corporation (JP)

( * ) Notice: Subject to any disclaimer, the term of this patent is extended or adjusted under 35 U.S.C. 154(b) by 238 days.

(21) Appl. No.: 15/979,505

(22) Filed: May 15, 2018

(65) Prior Publication Data

US 2018/0336431 A1    Nov. 22, 2018

Related U.S. Application Data (60) Provisional application No. 62/506,657, filed on May 16, 2017.

(51) Int. Cl.
*G06K 9/00* (2006.01)
*G06K 9/46* (2006.01)
(Continued)

(52) U.S. Cl.
CPC ....... *G06K 9/00798* (2013.01); *G06K 9/4628* (2013.01); *G06K 9/627* (2013.01); *G06K 9/6217* (2013.01); *G06K 9/6288* (2013.01); *G06K 9/66* (2013.01); *G06N 3/0445* (2013.01); *G06N 3/0454* (2013.01); *G06N 3/082* (2013.01);
(Continued)

(58) Field of Classification Search
None
See application file for complete search history.

(56) References Cited

U.S. PATENT DOCUMENTS

2017/0336203 A1* 11/2017 Barnes .................... G01S 17/88
2017/0337467 A1* 11/2017 Kadav ................... G06F 17/153
(Continued)

OTHER PUBLICATIONS

Molchanov P, Tyree S, Karras T, Aila T, Kautz J. Pruning convolutional neural networks for resource efficient inference. arXiv preprint arXiv:1611.06440. Nov. 19, 2016. (Year: 2016).*
(Continued)

*Primary Examiner* — Kim Y Vu
*Assistant Examiner* — Nathan J Bloom
(74) *Attorney, Agent, or Firm* — Joseph Kolodka (57) ABSTRACT

Systems and methods for predicting changes to an environment, including a plurality of remote sensors, each remote sensor being configured to capture images of an environment. A processing device is included on each remote sensor, the processing device configured to recognize and predict a change to the environment using a pruned convolutional neural network (CNN) stored on the processing device, the pruned CNN being trained to recognize features in the environment by training a CNN with a dataset and removing filters from layers of the CNN that are below a significance threshold for image recognition to produce the pruned CNN. A transmitter is configured to transmit the recognized and predicted change to a notification device such that an operator is alerted to the change.

15 Claims, 9 Drawing Sheets

(51) Int. Cl.
G06K 9/62 (2006.01)
G06K 9/66 (2006.01)
G06N 3/04 (2006.01)
G06N 3/08 (2006.01)
G06N 5/04 (2006.01)

(52) U.S. Cl.
CPC ........... *G06N 5/046* (2013.01); *G06K 9/0063* (2013.01); *G06K 9/00771* (2013.01); *G06K 9/00805* (2013.01)

(56) References Cited

U.S. PATENT DOCUMENTS

| | | | | |
|---|---|---|---|---|
| 2017/0337471 | A1* | 11/2017 | Kadav | G06F 17/153 |
| 2018/0300964 | A1* | 10/2018 | Lakshamanan | B60W 30/00 |
| 2018/0336425 | A1* | 11/2018 | Kadav | G06K 9/4628 |
| 2019/0347554 | A1* | 11/2019 | Choi | G06N 3/082 |

OTHER PUBLICATIONS

Shao J, Loy CC, Kang K, Wang X. Slicing convolutional neural network for crowd video understanding. InProceedings of the IEEE Conference on Computer Vision and Pattern Recognition, Nov. 2016 (pp. 5620-5628). (Year: 2016).*

Han, "Learning Both Weights and Connections for Efficient Neural Network", arXiv:1506.02626, Jun. 2015, pp. 1-9.

He, "Convolutional Neural Networks at Constrained Time Cost", IEEE Conference on CVPR, Jun. 2015, pp. 5353-5360.

He, "Deep Residual Learning for Image Recognition", IEEE Conference on CVPR, Jun. 2016, pp. 770-778.

* cited by examiner

PRUNING FILTERS FOR EFFICIENT CONVOLUTIONAL NEURAL NETWORKS FOR IMAGE RECOGNITION OF ENVIRONMENTAL HAZARDS

RELATED APPLICATION INFORMATION

This application claims priority to 62/506,657, filed on May 16, 2017, incorporated herein by reference in its entirety. This application is related to an application entitled "PRUNING FILTERS FOR EFFICIENT CONVOLUTIONAL NEURAL NETWORKS FOR IMAGE RECOGNITION IN SURVEILLANCE APPLICATIONS", Ser. No. 15,979,500, and an application entitled "PRUNING FILTERS FOR EFFICIENT CONVOLUTIONAL NEURAL NETWORKS FOR IMAGE RECOGNITION IN VEHICLES", Ser. No. 15,979,509, and which are incorporated by reference herein in their entirety.

BACKGROUND

Technical Field

The present invention relates to image recognition with neural networks and more particularly image recognition filter pruning for efficient convolutional neural networks for surveillance applications.

Description of the Related Art

Convolutional neural networks (CNNs) can be used to provide image recognition. As image recognition efforts have become more sophisticated, so have CNNs for image recognition, using deeper and deeper networks with greater parameters and convolutions. However, this trend also results in a greater need of the CNN for computational and power resources. Thus, image recognition with CNNs is impractical, and indeed, in some instances, impossible in embedded and mobile application. Even application that have the power and computational resources for accurate CNNs would benefit from more efficient image recognition. Simply compressing or pruning the weights of layers of a neural network would not adequately reduce the costs of a deep neural network.

SUMMARY

According to an aspect of the present principles, a system is provided for predicting changes to an environment. The system includes a plurality of remote sensors, each remote sensor being configured to capture images of an environment. A processing device is included on each remote sensor, the processing device configured to recognize and predict a change to the environment using a pruned convolutional neural network (CNN) stored on the processing device, the pruned CNN being trained to recognize features in the environment by training a CNN with a dataset and removing filters from layers of the CNN that are below a significance threshold for image recognition to produce the pruned CNN. A transmitter is configured to transmit the recognized and predicted change to a notification device such that an operator is alerted to the change.

According to an aspect of the present principles, a remote sensing device is provided for predicting changes to an environment. The device includes a sensor configured to capture images of an environment. An embedded processing device is configured to recognize and predict a change to the environment using a pruned convolutional neural network (CNN), the pruned CNN being trained to recognize features in the environment by training a CNN with a dataset and removing filters from layers of the CNN that are below a significance threshold for image recognition to produce the pruned CNN. A memory for storing the pruned CNN is in communication with the embedded processing device. A transmitter is configured to transmit the recognized and predicted change to a notification device such that an operator is alerted to the change.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with the present principles, systems and methods are provided for a convolutional neural network (CNN) trained with pruned filters for image recognition in surveillance applications.

In one embodiment, the number of filters in a CNN is reduced by pruning. This pruning is accomplished by training a CNN for image recognition in a surveillance application. Once trained, the filters of the CNN can be assessed by determining the weights of each filter. By removing the filters that have small weights, the filters that have little contribution to accuracy can be removed, and thus pruned.

Once the filters have been pruned, the CNN can be retrained until it reaches its original level of accuracy. Thus, fewer filters are employed in a CNN that is equally accurate. By removing filters, the number of convolution operations and reduced, thus reducing computation costs, including computer resource requirements as well as power requirements. This pruning process also avoids the need to maintain sparse data structures or sparse convolution libraries because the filters having lower contributions are completely removed. As a result, the pruned CNN can be made efficient enough to be employed in embedded devices and mobile devices such, e.g., digital cameras and camcorders, personal computers, tablets, smartphones, vehicles, drones, satellites, among others. Predictions may be made of future situations and actions according to the recognized images. Thus, a surveillance system employing the pruned CNN can leverage the more efficient image recognition to achieve situation predictions early and more quickly so that more effective and better-informed actions may be proactively taken.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 1:
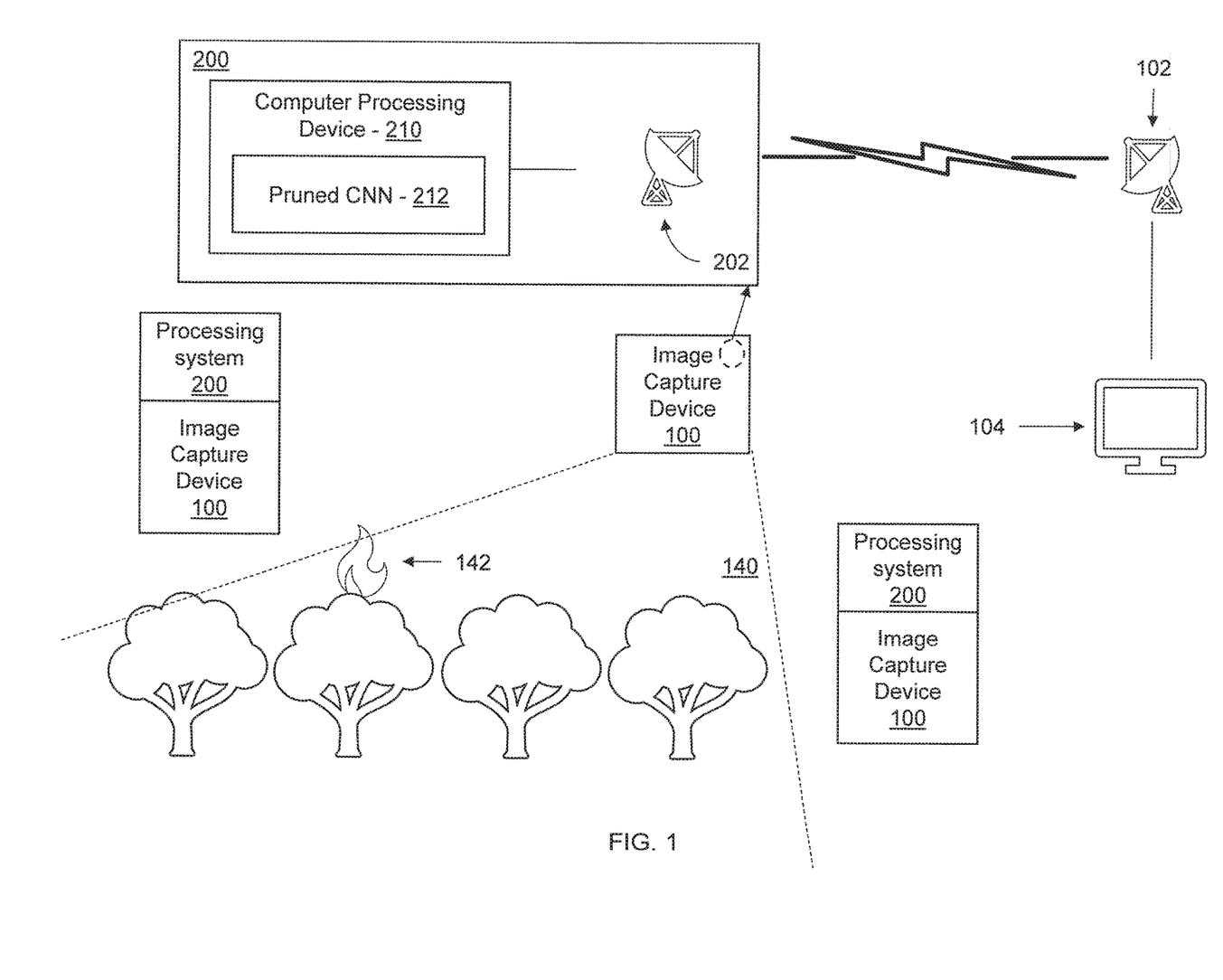
FIG. 1 is a block/flow diagram illustrating a high-level system/method for surveillance with image recognition using a pruned convolution neural network (CNN), in accordance with the present principles.

Referring now in detail to the figures in which like numerals represent the same or similar elements and initially to FIG. 1, a high-level system/method for surveillance with image recognition using a pruned convolution neural network (CNN) is illustratively depicted in accordance with one embodiment of the present principles.

In one embodiment, a system is contemplated for providing surveillance for a forest 140. According to aspects of the present invention, surveillance may include image recognition to facilitate the recognition and prediction of potentially dangerous or hazardous situations 142, such as, e.g., fires, floods, or any other natural or man-made condition in the forest 140.

Surveillance may be performed by one or more image capture devices 100. The image capture devices 100 is used to capture an image or sequence of images from a remote location of the forest 140 such that the image or sequence of images may be analyzed to recognize and predict a hazardous situation, such as, e.g., a wildfire 142. Accordingly, the image capture devices 100 may each include, e.g., a still or video camera mounted in a remote location, such as, e.g., a fixed tower or an autonomous or remotely operated drone. The image capture devices 100 can also include any other device incorporating a suitable sensor for capturing images (for example, e.g., a device including a charge-coupled device (CCD), a photodiode, a complementary metal oxide semiconductor (CMOS) sensor, infrared sensor, laser distance and ranging (LIDAR) sensor, among others). The remote image capture devices 100 can, therefore, include batteries for providing power to components.

The image capture devices 100 may each include a processing system 200 for performing the analysis, including image recognition. The processing system 200 may an internal component to the image capture device 100, or may be external and in communication to the image capture device 100. Accordingly, the processing system 200 may include, e.g., a system-on-chip (SOC), a computer processing unit (CPU), a graphical processing unit (GPU), a computer system, a network, or any other processing system.

The processing system 200 may include a computer processing device 210 for processing the image or sequence of images provided by the image capture devices 100. Accordingly, the computer processing device 210 can include, e.g., a CPU, a GPU, or other processing device or combination of processing devices. According to aspects of an embodiment of the present invention, the processing system 200 is an embedded processing system including, e.g., a SOC.

Such systems have strict power and resource constraints because they do not benefit from grid power or large packaging then provide a large volume of power, storage or processing power. Therefore, to perform the image recognition, the computer processing device 210 includes a pruned CNN 212. The pruned CNN 212 reduces the complexity of the CNN for image recognition by pruning particular portions of the CNN that have a relatively insignificant impact on the accuracy of the image recognition. Thus, pruning a CNN can reduce the resource requirements of the CNN by reducing complexity, while having minimal impact on the accuracy of the CNN. As a result, the pruned CNN 212 may be, e.g., stored in volatile memory, such as, e.g., dynamic random access memory (DRAM), processor cache, random access memory (RAM), or a storage device, among other possibilities. Accordingly, the pruned CNN 212 may be stored locally to an embedded or mobile processing system and provide accurate image recognition results.

It has been found that convolution operations contribute significantly towards overall computation. Indeed, the convolution operations themselves can contribute to up to about 90.9% of overall computation effort. Therefore, reducing the number of convolution operations through pruning will cause a corresponding reduction in computing resources demanded by the operation of the CNN, such as, e.g., electrical power, processing time, memory usage, storage usage, and other resources.

Thus, according to aspects of the present invention, the pruning of the CNN can take the form, e.g., of pruning filters from convolution layers of the CNN. According to aspects of one possible embodiment, a fully trained CNN is tested at each layer to locate the filters with small weights. Small weights may be determined, e.g., based on their relation to other filter weights (e.g., a number of the smallest weighted filters), or by being below a certain threshold value, or by another suitable standard. Alternatively, or in addition, sensitivity to pruning may be a determining factor for whether a filter is pruned. Sensitivity may be assessed by, e.g., removing a filter and testing the effect of the removal on accuracy to determine if it exceeds a threshold value at which a filter is deemed too sensitive pruning, and thus is replaced into the kernel matrix, or by comparing the weights of each kernel in the filter to a threshold magnitude, and if there are too few kernel weight weights with a magnitude below the threshold then the filter is deemed sensitive to pruning and should not be removed.

The filters with the small weights or that are not sensitive to pruning are then removed from the CNN. Thus, entire convolutional operations corresponding to the removed filters may be eliminated from the CNN. After removal, the CNN may then be retrained back to its original accuracy without the removed filters. Accordingly, the pruned CNN 212 has reduced resource requirements and can, therefore, can be more effectively implemented in the processing system 200. The pruning and retraining of the CNN may take place, e.g., on a separate computing system before being implemented in the processing system 200, or it may be performed by the processing system 200 itself.

The image recognition results from the pruned CNN 212 can be combined with action prediction to predict changes to situations. Thus, the processing system 200 analyzes the recognized imaged from the pruned CNN 212 to predict future movement and actions of features in the image or images. Thus, forest fires, for example, can be predicted and proactively addressed. The action prediction can be performed by the pruned CNN 212, or, e.g., by additional features such as, e.g., recurrent neural networks (RNN) including long short-term memory, among other prediction solutions.

The results, including the image recognition results and any predictions, can be communicated from the computer processing system 210 to a transmitter 202. The transmitter 202 may be included in the processing system 200, or it may be separate from the processing system 200. The transmitter 202 communicates the image recognition results to a remote location or device via a receiver 102 at that location or device. The communication may be wired or wireless, or by any suitable means to provide the image recognition results.

Upon receipt of the image recognition results, the receiver 102 communicates the results to a notification system 104. The notification system 104 provides a user with a notification of situations predicted with the recognized images, such as, an alert of a hazardous situation such as, e.g. a wildfire 142 by, e.g., a display of the recognized images and predicted situations including, e.g., present or predicted labelled images, object lists, actions, or conditions. Accordingly, the notification system 104 may take the form of, e.g., a display, a speaker, an alarm, or combinations thereof. Thus, a user may be notified of the features that have been recognized and predicted from an image by the pruned CNN 212, and act accordingly.

Moreover, the multiple remote image capture devices 100 can be deployed to perform image recognition and prediction in a single area. The results from each of the image capture devices 100 can then be cross referenced to determine a level of confidence of the results. Thus, accuracy of the image recognition and prediction can be improved using multiple remote image capture devices 100.

Figure 2:
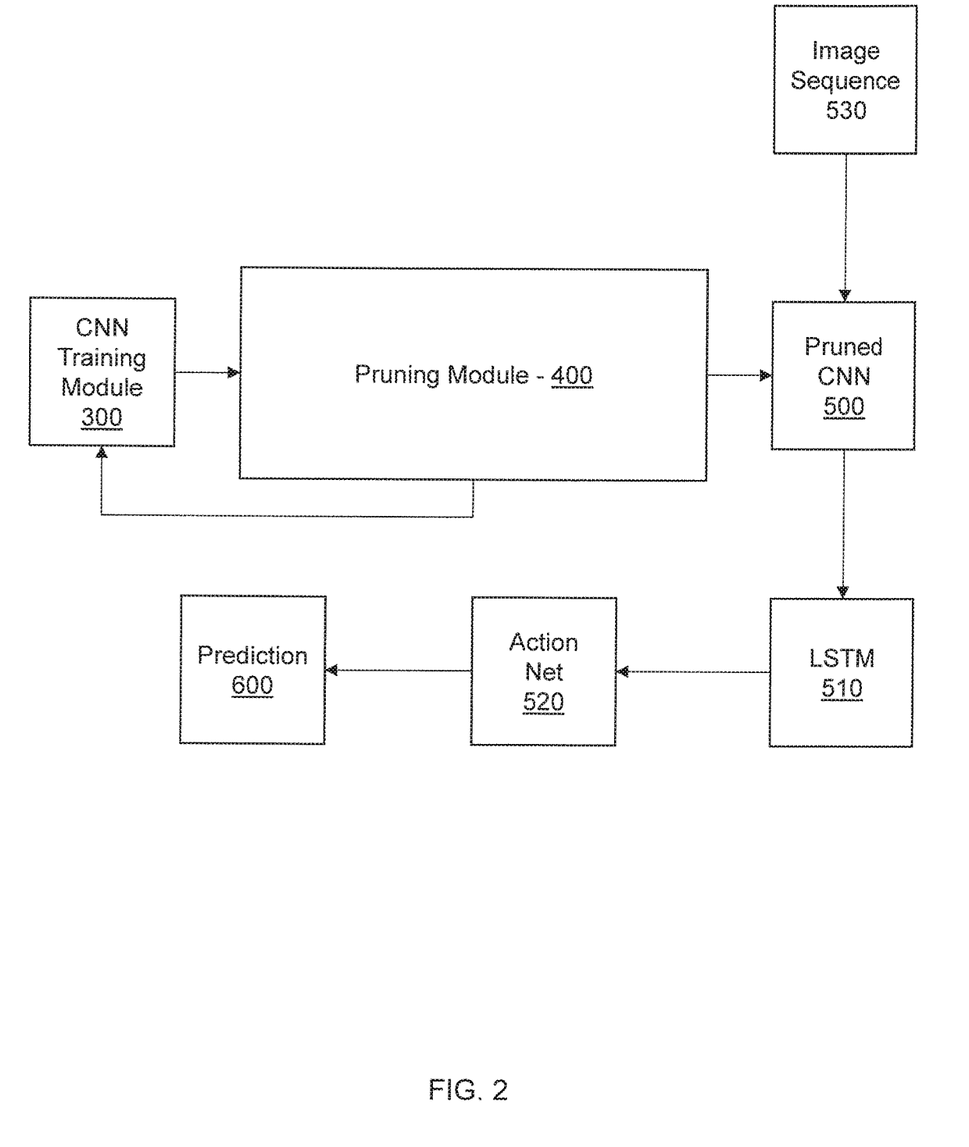
FIG. 2 is a block/flow diagram illustrating a system/method for image recognition using a pruned convolution neural network (CNN), in accordance with the present principles.

Referring now to FIG. 2, a system/method for image recognition using a pruned convolution neural network (CNN) is illustratively depicted in accordance with an embodiment of the present principles.

According aspects of an embodiment of the present invention, image recognition for surveillance may be performed to predict future actions of people and things in an environment. The image recognition is performed on an input image sequence 530. The image sequence 530 is a series of still or video images of an environment being surveilled.

The image sequence 530 is received by a pruned CNN 500. The pruned CNN 500 may be implemented in a computing device that has few resources to expend on convolutions. As discussed above, this computing device can include, e.g., embedded systems or mobile devices, among others. Therefore, power and computing resources are limited. However, using one of these computing devices allows for the use of surveillance equipment that is mobile, fast, and cheap. For example, the surveillance equipment could include, e.g., a smartphone, a drone, a smart doorbell system, a digital camera or camcorder, or any other suitable device. However, to facilitate image recognition on-board the surveillance equipment or by a similarly mobile, fast, cheap device in communication with the surveillance equipment permits image recognition on-site in locations where access to high computing power and large power sources is not feasible. Therefore, a pruned CNN 500 is implemented that has fewer computation requirements.

The pruned CNN 500 may be generated from a CNN trained by a CNN training module 300. The CNN training module 300 may be external to the surveillance equipment, such that upon training and pruning, the pruned CNN 500 is transferred to the surveillance equipment. However, the CNN training module 300 may alternatively be on-board the surveillance equipment.

The CNN training module 300 trains a CNN that can include a suitable CNN for image recognition, such as, e.g., a simple CNN including VGG-16, or a more complicated CNN including a residual CNN such as RESNET. The CNN may be trained using any suitable dataset, such as, e.g., CIFAR-10. The CNN training module 300 uses that dataset to input each image, and for each image, apply filters and generate intermediate feature maps through the depth of the CNN, testing the final feature maps and updating weights of the filters. This process may be performed any suitable number of times until the CNN is trained.

The trained CNN is then provided to a pruning module 400. The pruning module 400 prunes the CNN such that fewer convolutional operations need to be performed to generate a final feature map of the image recognition. Accordingly, the pruning module 400 can, for example, e.g., remove filters from the CNN that that are not significant to the image recognition task. A filter can be determined to not be significant because it is relatively rarely activated during image recognition. Thus, a filter that does not meet a threshold that represents the frequency of activation should be pruned. The threshold could be a weight value. In such a case, the weights of the filter are assessed and compared to the threshold. If the threshold is not met, then the filter is pruned from the CNN to reduce convolutional operations. Alternatively, the threshold could be based on a number for filters. In this case, the weights of the filters are assessed and the filters can be ranked according to their weights. A threshold number of the smallest filters can then be pruned from the CNN to reduce convolutional operations. Assessment of the weights can include any suitable assessment, such as, e.g., determining an average or a median weight for a filter, determining a sum of the weights, or determining an absolute sum of the weights for a filter, among other techniques for assessment.

Accordingly, filters are removed from the CNN, reducing the convolutional operations of the CNN, and thus reducing computational requirements. Upon pruning, the CNN may be returned the CNN training module 300 to be retrained without the pruned filters. This retraining may be performed after each filter is removed, or it may be performed after pruning filters through the depth of the CNN. The CNN may be retrained until it reaches the original level of accuracy of the trained CNN prior to pruning.

Upon pruning the CNN, the pruning module 400 provides the pruned CNN 500 to the surveillance equipment for image recognition, as discussed above. The pruned CNN 500 receives the image sequence 530 and performs image recognition to recognize objects and conditions present in each image. The image recognition results may take the form of image feature vectors, each image feature vector containing information about objects and conditions in a given image. Accordingly, in one embodiment, each image feature vector can include, e.g., 2048 dimensions for robust feature determination corresponding to image recognition.

The image recognition can include predictions about the objects and conditions, such as future movement. These predictions assist a user with surveillance by predicting possible threats, hazards or dangers. Therefore, the image feature vectors from the pruned CNN 500 can be provided to, e.g., a recurrent neural network such as, e.g., a long short-term memory network (LSTM) 510. The LSTM 510 will have been trained to use the image feature vectors to generate an action feature vector that can be, e.g., smaller than the image feature vector. In one embodiment, the action feature vector generated by the LSTM 510 can include, e.g., a 1024-dimension action feature vector. The LSTM 510 generates, with the action feature vector, predictions of future actions of the objects and conditions in the image sequence 530.

In one embodiment, action feature vector can then be processed to generate probabilities of predicted actions. Accordingly, an action net 520 is employed to receive the action feature vector. The action net 520 will have been trained to use the action feature vector to generate n class output probabilities that form the probabilities of predicted actions to generate a prediction 600 corresponding to the surveillance.

Figure 3:
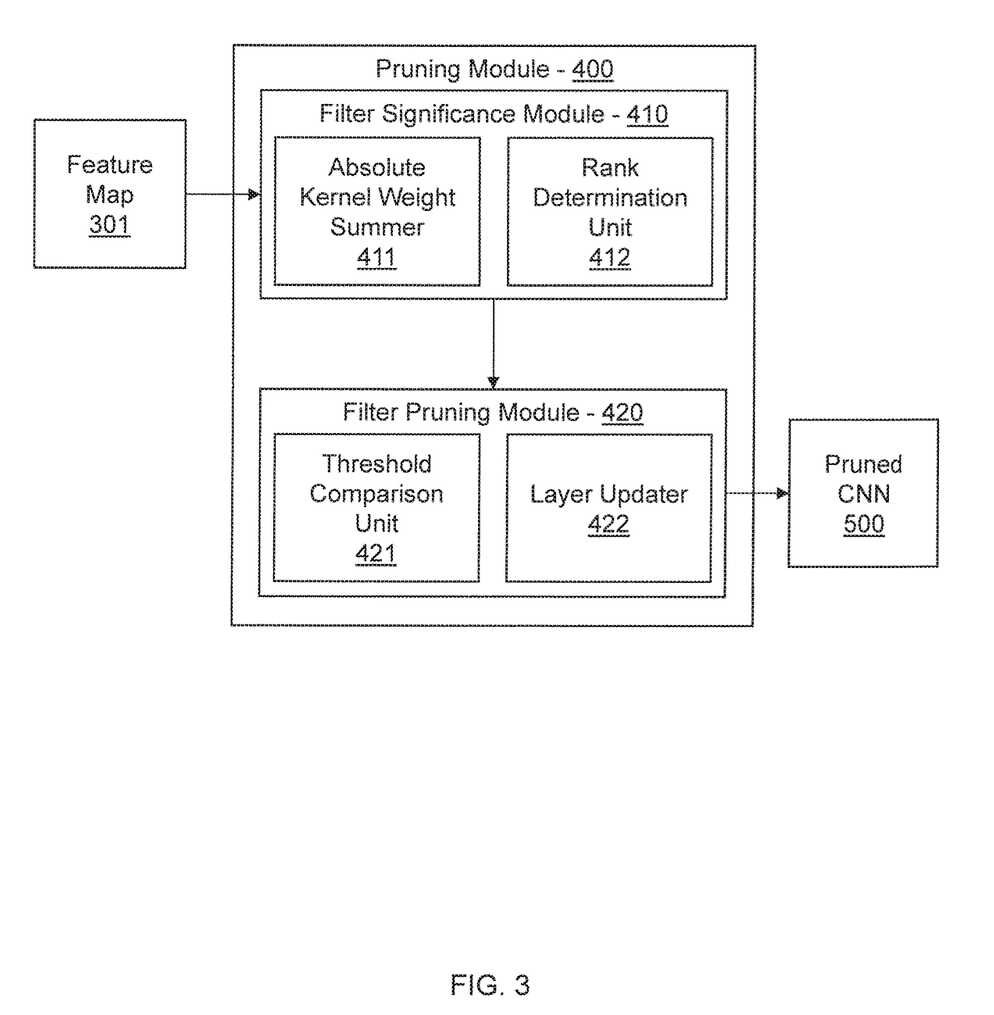
FIG. 3 is a block/flow diagram illustrating a system/method for pruning filters of a convolution neural network (CNN), in accordance with the present principles.

Referring now to FIG. 3, a system/method for pruning filters of a convolution neural network (CNN) is illustratively depicted in accordance with an embodiment of the present principles.

According to aspects of an embodiment of the present invention, the pruning module 400 prunes filters from a trained CNN based on, e.g., a sum of absolute kernel weights in the filter. The filters are pruned by first inputting the trained CNN 301. The trained CNN 301 includes initial, intermediate, and final feature maps with associated trained filters and kernel matrices. In training, weights of the kernel matrices are determined by inputting training images, applying the existing filters with kernel matrices, and updated the weights of the kernel matrices based on an error of the output.

Pruning unnecessary filters facilitates reducing convolutional operations of the trained CNN 301. Therefore, unnecessary filters are determined by a filter significance module 411 of the pruning module 400.

The filter significance module 411 includes an absolute kernel weight summer 411. The absolute kernel weight summer 411 calculates the absolute kernel weights of a filter, and sums the absolute kernel weights. The sum of the absolute kernel weights is representative of the magnitude of the filter to which it applies. Therefore, a lower absolute kernel weight sum will indicate that a filter has less effect on the image recognition process, and is thus activated less frequently. Accordingly, the lower the absolute kernel weight sum of a filter, the lower the significance of that filter.

Furthermore, sensitivity to pruning can be a determining factor for whether a filter is pruned. Sensitivity may be assessed by, e.g., removing a filter and testing the effect of the removal on accuracy to determine if it exceeds a threshold value at which a filter is deemed too sensitive pruning, and thus is replaced into the kernel matrix, or by comparing the weights of each kernel in the filter to a threshold magnitude, and if there are too few kernel weight weights with a magnitude below the threshold then the filter is deemed sensitive to pruning and should not be removed. Other methods of determining sensitivity to pruning are also contemplated.

According to aspects of the present invention, based on the absolute kernel weight sums calculated by the absolute kernel weight summer 411, the filters of a given set of feature maps can be ranked by the rank determination unit 412. The rank of a given filter may be determined by the magnitude of the absolute kernel weight sum pertaining to that filter, with the rank forming, e.g., a spectrum of filter magnitudes from least to greatest. However, other ranking methodologies are contemplated.

The ranks filters may then be analyzed by the filter pruning module 420. The filter pruning module 420 includes a threshold comparison unit 421. This threshold comparison unit 421 is configured to compare the absolute kernel weight sums for each of the filters with a threshold. The threshold can be predetermined or can change according to a distribution of absolute kernel weight sums. For example, the threshold can include a threshold absolute kernel weight sum. In this embodiment, the absolute kernel weight sums of each filter are compared with the threshold value, and if the absolute kernel weight sum of a given filter is below the threshold value, then the filter is removed. Alternatively, the threshold can be a threshold number of filters. Thus, the threshold comparison unit 421 may compare the number of filters that exist in the trained CNN 301 at a given convolutional layer with a threshold number of filters. A difference, m, may then be taken between the threshold value and the number of filters, with the difference, m, indicating the number of filters to be removed. Then, m of the smallest filters are removed. However, this threshold value may instead indicate a set number of the smallest filter to be removed. For example, rather than a difference, m may be a predetermined value of the smallest filters to be removed from the convolutional layer.

Once filters of a given convolutional layer are removed, the CNN can be updated to reflect the removal. Thus, a layer updater 422 will update the trained CNN 301 by removing the kernels for the subsequent convolutional layer that corresponds to the removed filter. The kernel matrices for the given and the subsequent convolutional layers can then be reconstructed to reflect the removed filters and removed kernels.

Each convolutional layer of the trained CNN 301 will be processed by the pruning module 400 as described above. The CNN can be retrained iteratively after each layer is pruned, or all of the layers may be pruned before retraining the CNN. However, in either case, upon pruning all of the layers, the pruning module 400 will output a pruned CNN 500 to be used for image recognition. The pruned CNN 500 will be significantly less complex than the original trained CNN 301, while maintaining substantially the same level of accuracy because only the insignificant filters for the image recognition task are removed. Thus, the pruned CNN 500 can be incorporated, as discussed above, into a system have low computational or power resources, such as, e.g., embedded or mobile systems. Additionally, the pruned CNN 500 will also be faster than the original trained CNN 301 due to the reduction in convolutional operations. Thus, even if used in a system having high resources, the pruned CNN 500 is still beneficial because the pruned CNN 500 is more efficient and can therefore perform the surveillance image recognition task more quickly, thus having benefits even in applications where resource constraints are not a concern.

Figure 4:
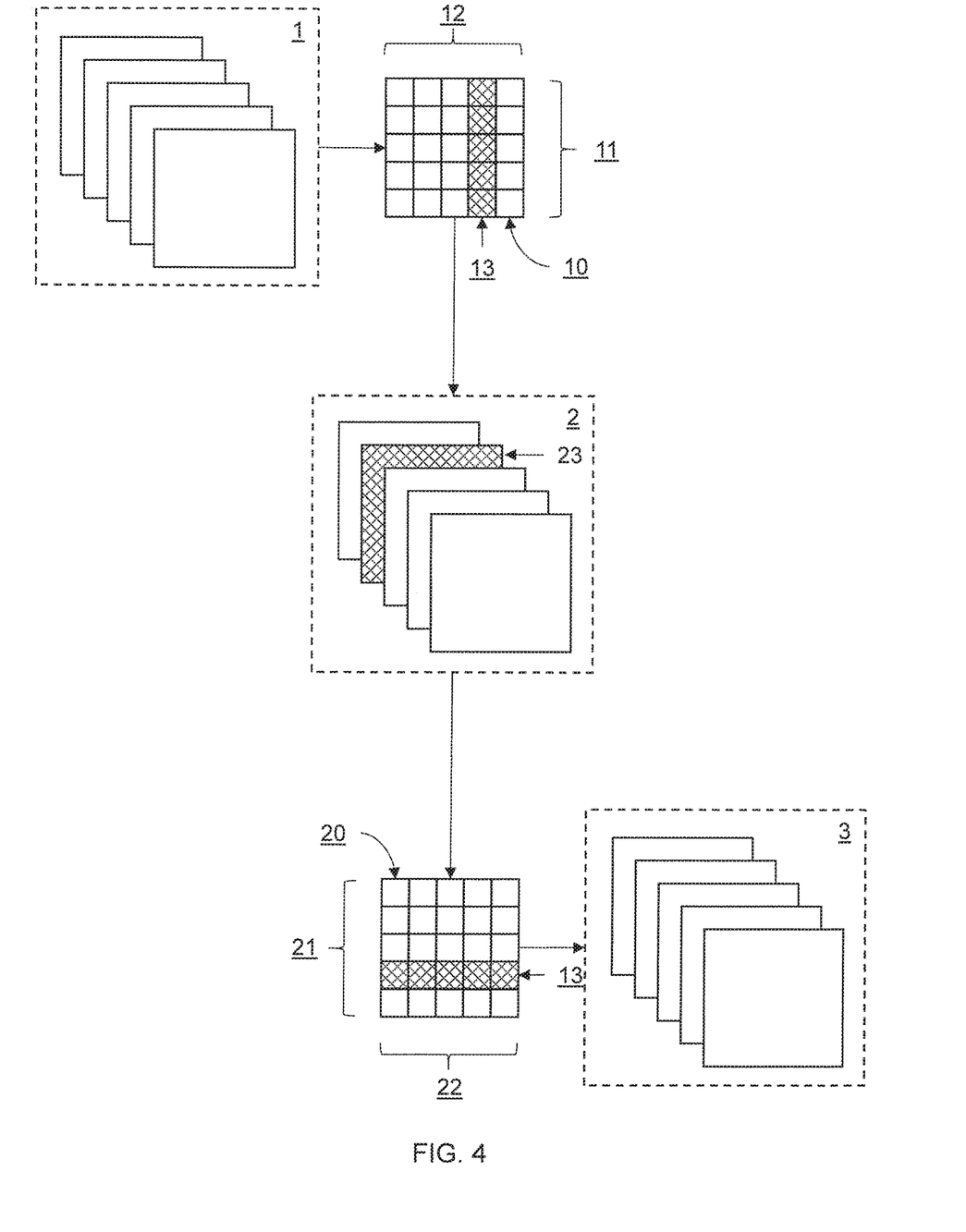
FIG. 4 is a block/flow diagram illustrating a system/method for pruning filters of a simple convolution neural network (CNN), in accordance with the present principles.

Referring now to FIG. 4, a system/method for pruning filters of a simple convolution neural network (CNN) is illustratively depicted in accordance with an embodiment of the present principles.

According to an embodiment of the present invention, filter 13 pruned from a kernel matrix 10 is illustrated. Pruning includes a set of input feature maps 1 and intermediate and/or output feature maps 2 and 3. The input feature maps 1 have filters applied with kernel matrix 10 to generate feature maps 2. Similarly, feature maps 2 have filters applied with kernel matrix 20 to generate feature maps 3.

A feature map 13 may be pruned from feature maps 2 using the absolute kernel weight sums from kernel matrix 10, where each box in the kernel matrix 10 corresponds to a kernel for a filter. A vertical axis of the kernel matrix 10 is the input channels 11 while the horizontal axis is the output channels 12. Thus, the columns of kernel matrix 10 form a 3D filter for generating the feature maps 2.

To determine the magnitude, and thus significance, of a filter, absolute kernel magnitudes of each kernel in a given column are summed. Each filter can then be compared to a threshold, as discussed above. The comparison can result in a pruned filter 13. The pruned filter 13 may be pruned because the sum of absolute kernel weights of the kernel for that filter is below a threshold, or because it has the lower sum compared to the other filters in the kernel matrix 10. Because the pruned filter 13 is removed, the corresponding feature map 23 is also removed from the subsequent layer of feature maps 2.

In the kernel matrix 20, as with the kernel matrix 10, the vertical axis relates to an input channel 22. Because the input channel 22 of this subsequent kernel matrix 20 corresponds to the output channel 12 of the previous kernel matrix 10, the removal of the filter 13 is reflected in kernel matrix 20 by the removal of a row that corresponds to the column of the pruned filter 13 in kernel matrix 10 and the feature map 23.

Accordingly, the pruning of a filter 13 results in the removal the corresponding kernels of kernel matrix 10, as well as the subsequent corresponding feature map 23 and the corresponding kernels in kernel matrix 20 to the pruned filter 13.

Figure 5:
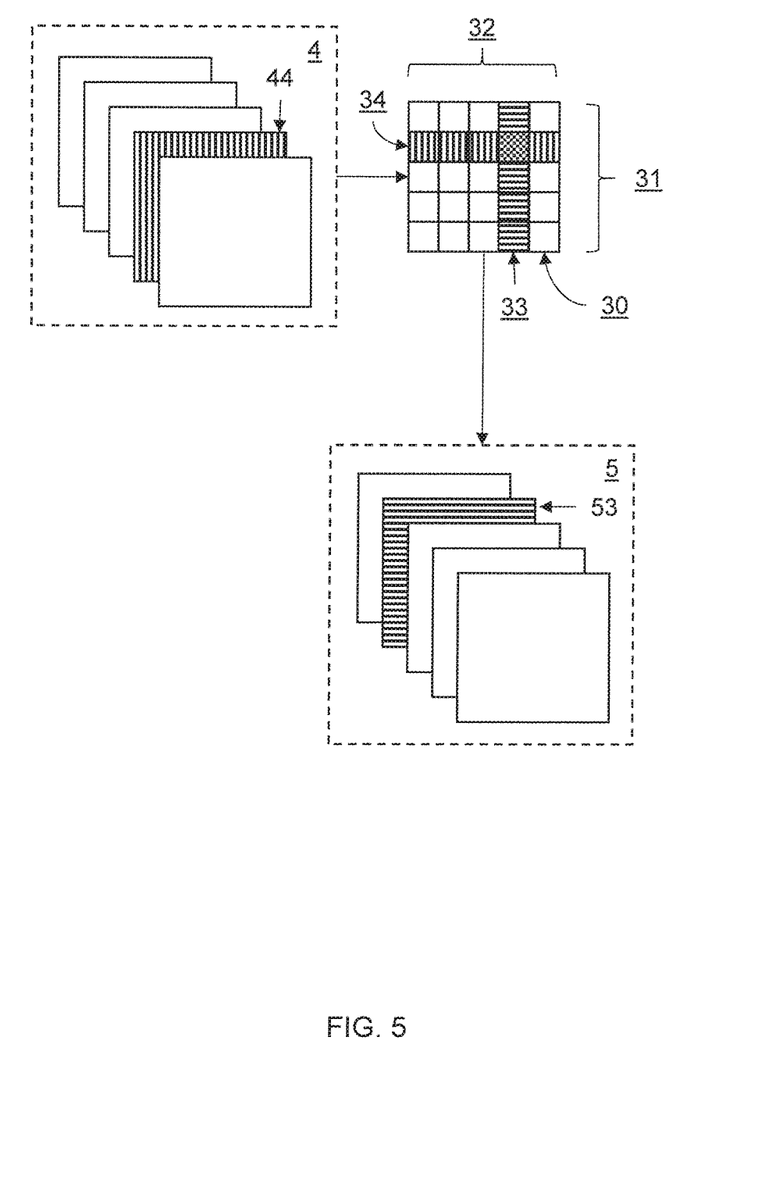
FIG. 5 is a block/flow diagram illustrating a system/method for pruning intermediate filters of a simple convolution neural network (CNN), in accordance with the present principles.

Referring now to FIG. 5, a system/method for pruning intermediate filters of a simple convolution neural network (CNN) is illustratively depicted in accordance with an embodiment of the present principles.

According to an embodiment of the present invention, filter 33 pruned from a kernel matrix 30 is illustrated. Pruning includes a set of intermediate feature maps 4 and subsequent intermediate and/or output feature maps 5. The intermediate feature maps 4 have filters applied with kernel matrix 30 to generate subsequent feature maps 5.

In this example, feature map 44 has already been pruned from intermediate feature maps 4. Accordingly, as discussed above, the feature maps 4 being input into input channel 31 results in a row of kernels for filter 34 in kernel matrix 30 being removed corresponding to the removed feature map 44.

The output channel 32 is then pruned by determining the absolute kernel weight sum for each filter (column) in the kernel matrix 30. Because the filter 34 has been removed from the kernel matrix 30, the weights of the kernels in that filter are not considered for the calculation of absolute kernel weight sums. The result of the calculation of absolute kernel weight sums permits the comparison of each filter with a threshold, as discussed above. As a result, filter 33 may be pruned as being below the threshold.

Because filter 33 for the output channel 32 has been removed, the corresponding feature map 53 of subsequent feature maps 5 will also be removed. Thus, a feature map from each of feature maps 4 and 5 are removed according to the pruning process, thus reducing convolutional operations accordingly, and reducing the requirement resources of employing the CNN.

Figure 6:
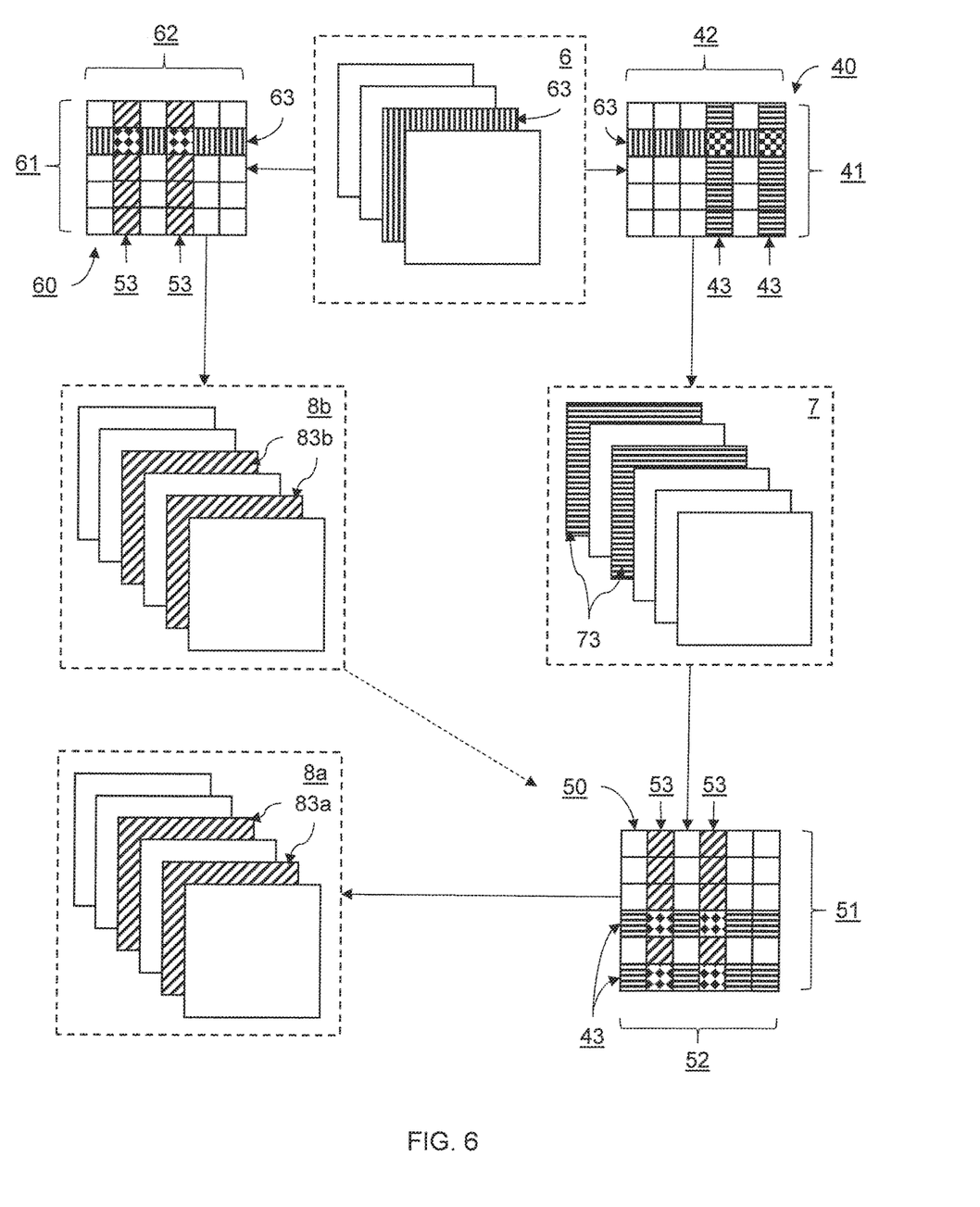
FIG. 6 is a block/flow diagram illustrating a system/method for pruning intermediate filters of a residual convolution neural network (CNN), in accordance with the present principles.

Referring now to FIG. 6, a system/method for pruning intermediate filters of a residual convolution neural network (CNN) is illustratively depicted in accordance with an embodiment of the present principles.

According to an embodiment of the present invention, a more complicated CNN may be pruned, such as, e.g., a residual CNN (for example, RESNET). In such a CNN, The RESNET CNN will include a projection shortcut kernel matrix 60 and a residual block kernel matrix 40. Intermediate feature maps 6 may include an already pruned feature map 63. To prune subsequent filters, the feature maps 6 may be filtered with both the projection shortcut kernel matrix 60 and the residual block kernel matrix 40 independently, thus creating two separate sets of feature maps, projection shortcut feature maps 8b and residual block feature maps 7.

The filters of kernel matrix 40 may be pruned to remove pruned filters 43 according to systems and methods discussed above. As a result, the corresponding feature maps 73 are removed from feature maps 7. However, filters of a subsequent kernel matrix 50 are not pruned according to a threshold comparison of the absolute kernel weight sums of filters in the kernel matrix 50. Rather, pruned filters 53 are determined according to an analysis of the projection shortcut kernel matrix 60. Accordingly, the filters of the projection shortcut kernel matrix 60 under absolute kernel weight summation and comparison to a threshold according to aspects of the invention described above. As a result, pruned filters 53 are determined to be pruned from the projection shortcut kernel matrix 60.

Therefore, corresponding projection shortcut feature maps 8b are generated in parallel to the residual block feature maps 7 and reflecting the removal of pruned filters 53. As a result of the removal of pruned filters 53, the corresponding projection shortcut feature maps 83b are removed from the projection shortcut feature maps 8b. The projection shortcut feature maps 8b are used to determine pruned filters 53 in the subsequent residual block kernel matrix 50. Accordingly, resulting subsequent residual block feature maps 8a are updated to reflect the removal of pruned subsequent residual feature maps 83a corresponding to the pruned filter 53.

Figure 7:
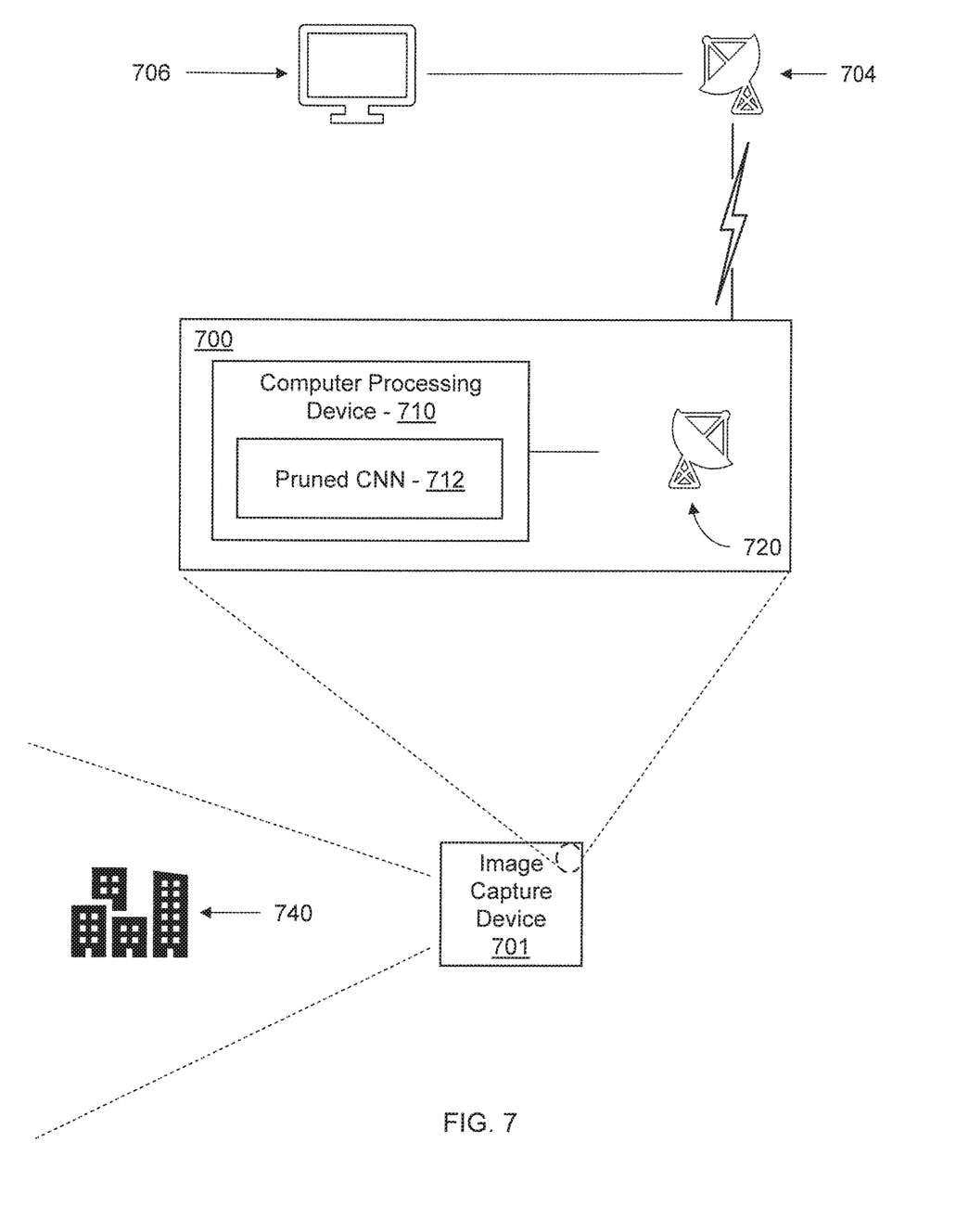
FIG. 7 is a block/flow diagram illustrating a high-level system/method for surveillance of forest fires with image recognition using a pruned convolution neural network (CNN), in accordance with the present principles.

Referring now to FIG. 7, a high-level system/method for surveillance of forest fires with image recognition using a pruned convolution neural network (CNN) is illustratively depicted in accordance with an embodiment of the present principles.

In one embodiment, a system is contemplated for providing surveillance for an area of interest 740. The area of interest 740 may be, e.g., the interior or exterior of a building (for example, a shopping mall, airport, office building, etc.), a parking lot, the interior or exterior of a house, or any other public or private place for which surveillance may be desired. According to aspects of the present invention, surveillance may include image recognition to facilitate the recognition and response to potentially dangerous or hazardous situations, such as, e.g., fires, floods, criminal activity, or any other natural or man-made condition in the area of interest 740.

Surveillance may be performed by an image capture device 701. The image capture device 701 is used to capture an image or sequence of images of the area of interest 740 such that the image or sequence of images may be analyzed to recognize or predict a hazardous situation. Accordingly, the image capture device 701 may include, e.g., a still or video camera, or any device incorporating a suitable sensor for capturing images (for example, e.g., a device including a charge-coupled device (CCD), a photodiode, a complementary metal oxide semiconductor (CMOS) sensor, infrared sensor, laser distance and ranging (LIDAR) sensor, among others).

The image capture device 701 may include a processing system 700 for performing the analysis, including image recognition. The processing system 700 may an internal component to the image capture device 701, or may external and in communication to the image capture device 701. Accordingly, the processing system 700 may include, e.g., a system-on-chip (SOC), a computer processing unit (CPU), a graphical processing unit (GPU), a computer system, a network, or any other processing system.

The processing system 700 may include a computer processing device 710 for processing the image or sequence of images provided by the image capture device 701. Accordingly, the computer processing device 710 can include, e.g., a CPU, a GPU, or other processing device or combination of processing devices. According to aspects of an embodiment of the present invention, the processing system 700 is an embedded processing system including, e.g., a SOC, or a mobile device such as, e.g., a smartphone.

Such systems have strict power and resource constraints because they do not benefit from grid power or large packaging then provide a large volume of power, storage or processing power. Therefore, to perform the image recognition, the computer processing device 710 includes a pruned CNN 712. The pruned CNN 712 reduces the complexity of the CNN for image recognition by pruning particular portions of the CNN that have a relatively insignificant impact on the accuracy of the image recognition. Thus, pruning a CNN can reduce the resource requirements of the CNN by reducing complexity, while having minimal impact on the accuracy of the CNN. As a result, the pruned CNN 712 may be, e.g., stored in volatile memory, such as, e.g., dynamic random access memory (DRAM), processor cache, random access memory (RAM), or a storage device, among other possibilities. Accordingly, the pruned CNN 712 may be stored locally to an embedded or mobile processing system and provide accurate image recognition results.

The image recognition results from the pruned CNN 712 can be combined with action prediction to predict changes to situations. Thus, the processing system 700 analyzes the recognized imaged from the pruned CNN 712 to predict future movement and actions of features in the image or images. Thus, dangerous and hazardous situations can be predicted and proactively addressed. The action prediction can be performed by the pruned CNN 712, or, e.g., by additional features such as, e.g., recurrent neural networks (RNN) including long short-term memory, among other prediction solutions.

The results, including the image recognition results and any predictions, communicated from the computer processing 710 to a transmitter 720. The transmitter 720 may be included in the processing system 700, or it may be separate from the processing system 700. The transmitter 720 communicates the image recognition results to a remote location or device via a receiver 704 at that location or device. The communication may be wired or wireless, or by any suitable means to provide the image recognition results.

Upon receipt of the image recognition results, the receiver 704 communicates the results to a notification system 706. The notification system 706 provides a user with a notification of the recognized images, such as, an alert of a hazardous situation (for example, an alarm, flashing lights, visual message on a display, or auditory message from a speaker, among others), a display of the recognized images including, e.g., present or predicted labelled images, object lists, actions, or conditions. Accordingly, the notification system 706 may take the form of, e.g., a display, a speaker, an alarm, or combinations thereof. Thus, a user may be notified of the features that have been recognized in an image by the pruned CNN 712, and act accordingly.

Figure 8:
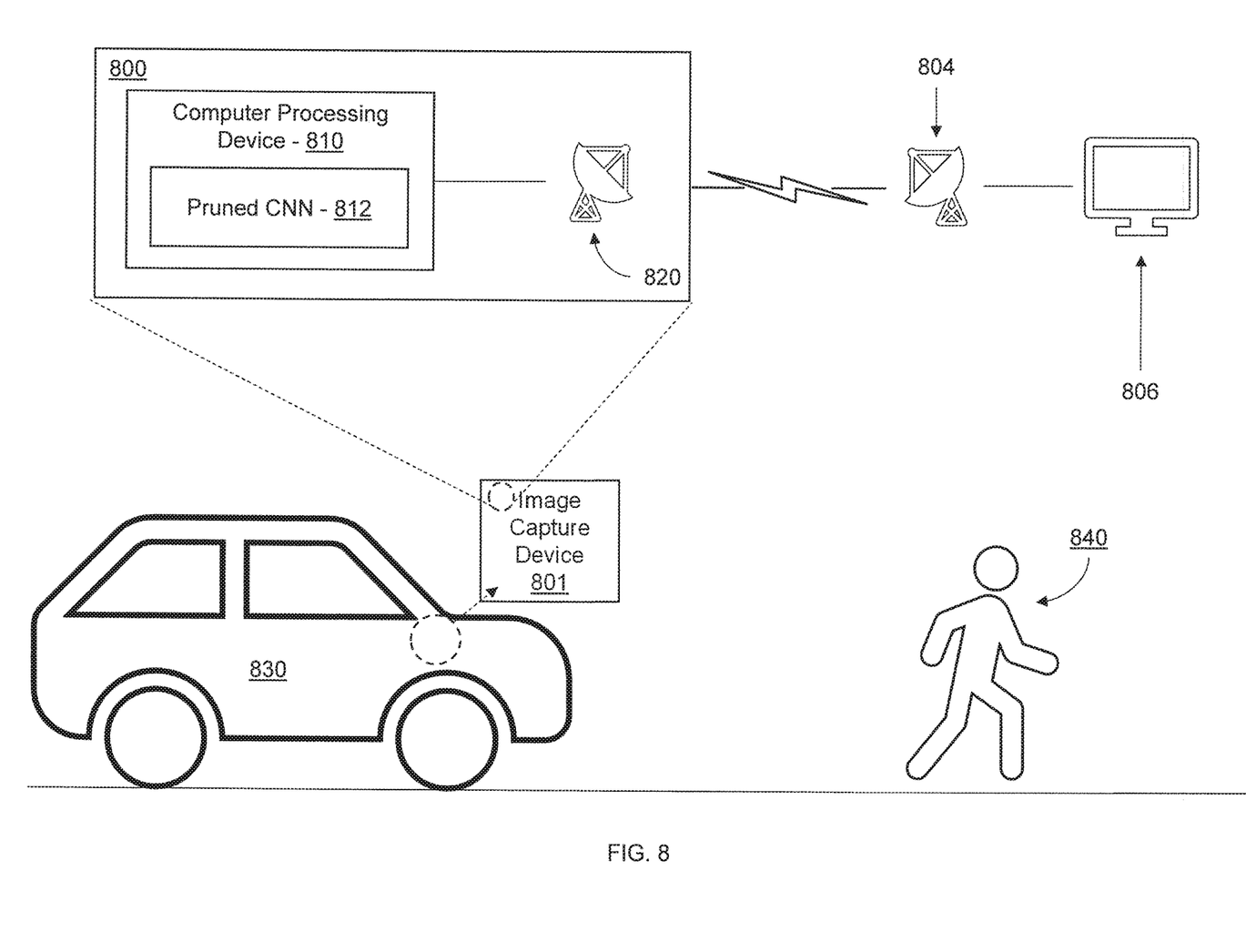
FIG. 8 is a block/flow diagram illustrating a high-level system/method for surveillance for vehicles with image recognition using a pruned convolution neural network (CNN), in accordance with the present principles.

Referring now to FIG. 8, a high-level system/method for surveillance for vehicles with image recognition using a pruned convolution neural network (CNN) is illustratively depicted in accordance with an embodiment of the present principles.

In one embodiment, a system is contemplated for providing surveillance for a vehicle 830, such as, e.g., an autonomous vehicle, a semi-autonomous vehicle, an autonomous drone, a user operated vehicle, among others. According to aspects of the present invention, surveillance may include image recognition to facilitate the recognition and response to potentially dangerous or hazardous situations, such as, e.g., pedestrians 840, obstacles, other vehicles, lane line, among others.

Surveillance may be performed by an image capture device 801. The image capture device 801 is used to capture an image or sequence of images of the vehicle 830 such that the image or sequence of images may be analyzed to recognize or predict route obstacles. Accordingly, the image capture device 801 may include, e.g., a still or video camera, or anything device incorporating a suitable sensor for capturing images (for example, e.g., a device including a charge-coupled device (CCD), a photodiode, a complementary metal oxide semiconductor (CMOS) sensor, infrared sensor, laser distance and ranging (LIDAR) sensor, among others). Moreover, the image capture device 801 can be included with the vehicle 840, or it can be a separate device that is mountable to the vehicle 830. In any case, the image capture device 801 can include a power source, such as, e.g., a battery, or it can be powered by a battery included in the vehicle 830.

The image capture device 801 may include a processing system 800 for performing the analysis, including image recognition. The processing system 800 may an internal component to the image capture device 801, or may be external and in communication to the image capture device 801. Accordingly, the processing system 800 may include, e.g., a system-on-chip (SOC), a computer processing unit (CPU), a graphical processing unit (GPU), a computer system, a network, or any other processing system.

The processing system 800 may include a computer processing device 810 for processing the image or sequence of images provided by the image capture device 801. Accordingly, the computer processing device 810 can include, e.g., a CPU, a GPU, or other processing device or combination of processing devices. According to aspects of an embodiment of the present invention, the processing system 800 is an embedded processing system including, e.g., a SOC, or a mobile device such as, e.g., a smartphone.

Such systems have strict power and resource constraints because they do not benefit from grid power or large packaging then provide a large volume of power, storage or processing power. Therefore, to perform the image recognition, the computer processing device 810 includes a pruned CNN 812. The pruned CNN 812 reduces the complexity of the CNN for image recognition by pruning particular portions of the CNN that have a relatively insignificant impact on the accuracy of the image recognition. Thus, pruning a CNN can reduce the resource requirements of the CNN by reducing complexity, while having minimal impact on the accuracy of the CNN. As a result, the pruned CNN 812 may be, e.g., stored in volatile memory, such as, e.g., dynamic random access memory (DRAM), processor cache, random access memory (RAM), or a storage device, among other possibilities. Accordingly, the pruned CNN 812 may be stored locally to an embedded or mobile processing system and provide accurate image recognition results.

The image recognition results from the pruned CNN 812 can be combined with action prediction to predict changes to situations. Thus, the processing system 800 analyzes the recognized imaged from the pruned CNN 812 to predict future movement and actions of features in the image or images. Thus, obstacles in the road, such as, e.g., pedestrians, downed trees, animals, other vehicles, etc. can be predicted and proactively addressed. The action prediction can be performed by the pruned CNN 812, or, e.g., by additional features such as, e.g., recurrent neural networks (RNN) including long short-term memory, among other prediction solutions.

The results, including the image recognition results and any predictions, can be communicated from the computer processing system 810 to a transmitter 820. The transmitter 820 may be included in the processing system 800, or it may be separate from the processing system 800. The transmitter 820 communicates the image recognition results to a receiver 804. The communication may be wired or wireless, or by any suitable means to provide the image recognition results. The receiver 804 may be external to the vehicle 830, or it may a part of the vehicle 830. Thus, the computer processing system 810 can send the results to, e.g., a remote operator, a local operator, or to the vehicle 830 itself.

Upon receipt of the image recognition results, the receiver 804 can communicate the results to a notification system 806. The notification system 806 provides a user with a notification of the recognized images, such as a pedestrian 840 by, e.g., a display of the recognized images and predicted obstacles including, e.g., present or predicted labelled images, object lists, actions, or conditions. Accordingly, the notification system 806 may take the form of, e.g., a display, a speaker, an alarm, or combinations thereof. Thus, a user may be notified of the features that have been recognized and obstacles predicted by the pruned CNN 812, and act accordingly. The notification system 806 may be at a remote location for a remote device operator, or it may be internal to the vehicle, such as in the case of notifying an operator of the vehicle. Additionally, the processing system 800 of the vehicle 830 can be programmed to automatically take action to avoid a recognized or predicted obstacle by, e.g., turning, stopping, or taking any other suitable evasive action.

Figure 9:
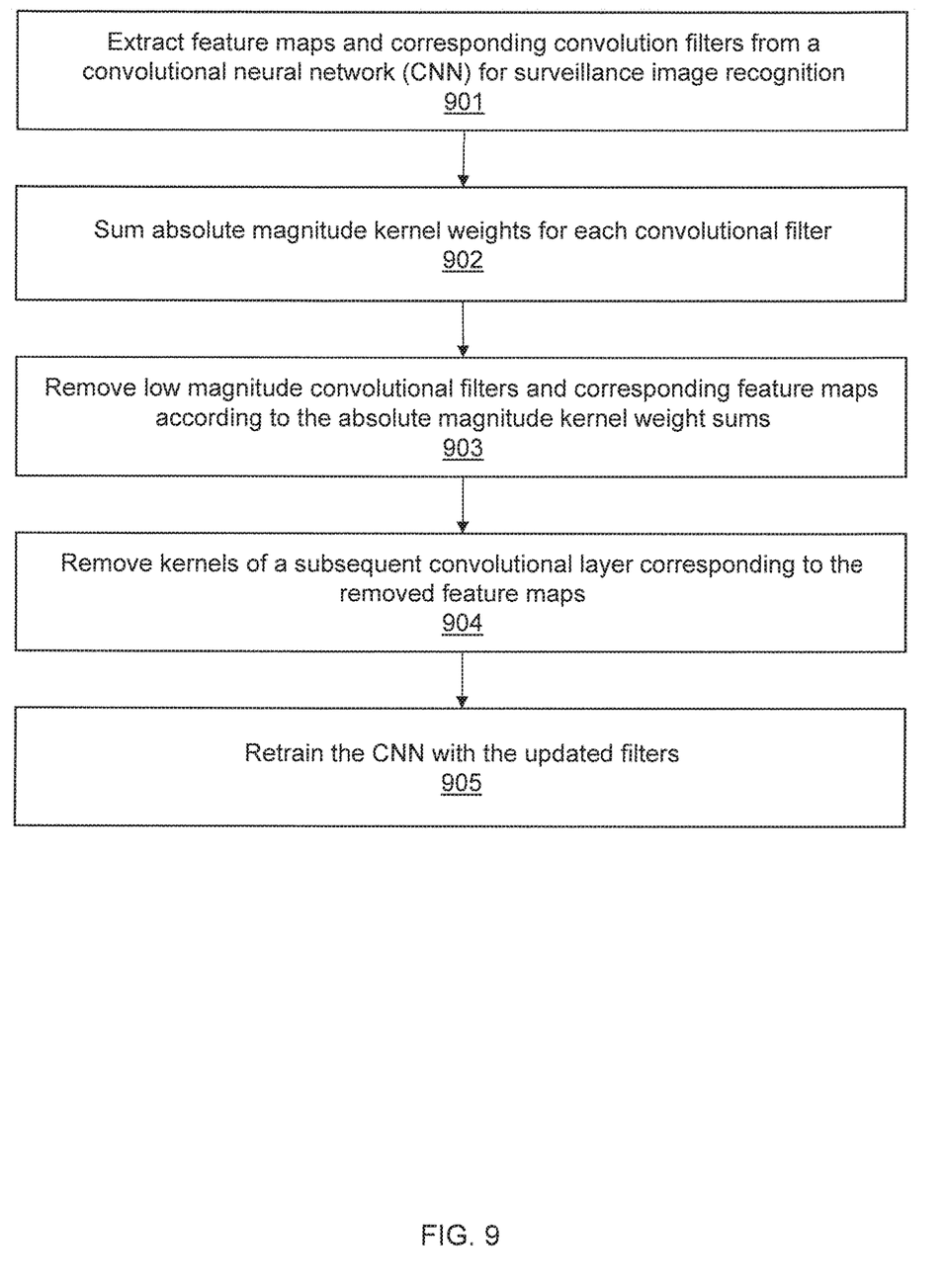
FIG. 9 is a flow diagram illustrating a system/method for image recognition using a pruned convolution neural network (CNN), in accordance with the present principles.

Referring now to FIG. 9, a flow diagram illustrating a system/method for image recognition using a pruned convolution neural network (CNN) is illustratively depicted in accordance with an embodiment of the present principles.

At block 901, feature maps and corresponding convolution filters are extracted from a convolutional neural network (CNN) for surveillance image recognition.

The CNN is a fully trained CNN for image recognition. Through the training and testing process of the CNN, the convolution layers can be extracted. Each convolutional layer includes a set of feature maps with a corresponding kernel matrix. The feature maps have corresponding filters that influence the generation of the feature maps according to the kernel weights for each filter. As discussed above, a filter may be a 3-dimensional (3D) filter having a kernel at each input channel of a kernel matrix. Thus, a set of kernels, one from each input channel, forms a filter for an output channel of the kernel matrix. The filter is used to generate an output feature map. The kernel matrix includes a plurality of filters, each corresponding to a particular feature map.

At block 902, absolute magnitude kernel weights are summed for each convolutional filter.

As discussed above, each filter includes a kernel from each input channel of the kernel matrix. The magnitude of a filter can be represented by calculating the absolute kernel weight of each kernel, and then summing those weights for each filter. The magnitude of a filter is indicative of the frequency with which a filter is activated for image recognition.

At block 903, low magnitude convolutional filters and corresponding feature maps are removed according to the absolute magnitude kernel weight sums.

Because convolutional operations are very computational costly, the removal of convolutional filters, which reduces convolutional operations, can reduce the computation cost of the CNN. Therefore, upon determining the magnitude of each filter in a layer, filters with low magnitudes can be removed.

The filters to be removed can be determined by a comparison with a threshold value. For example, filters having a magnitude below a certain threshold can be removed. As another example, a certain number of the smallest filters can be removed. Other possible thresholds are contemplated.

Alternatively, or in addition, sensitivity to pruning may be a determining factor for whether a filter is pruned. Sensitivity may be assessed by, e.g., removing a filter and testing the effect of the removal on accuracy to determine if it exceeds a threshold value at which a filter is deemed too sensitive pruning, and thus is replaced into the kernel matrix, or by comparing the weights of each kernel in the filter to a threshold magnitude, and if there are too few kernel weight weights with a magnitude below the threshold then the filter is deemed sensitive to pruning and should not be removed.

Because a filter is removed, the corresponding output feature map from that filter should be removed as well. Thus, the feature map set at a given layer is reduced in size. This reduction results in a corresponding reduction in resource requirements for implementing the CNN.

At block 904, kernels of a subsequent convolutional layer corresponding to the removed feature maps are removed.

The removal of a particular filter and feature map affects subsequent kernel matrices. In particular. A filter, including a set of kernels for an output channel in the kernel matrix of a given layer, that is removed from the kernel matrix result in the corresponding kernels being absent from the input channel of a kernel matrix in a subsequent layer. As a result, the subsequent kernel matrix should be updated with the kernels of the removed filter pruned so that the pruning of the subsequent kernel matrix is not influenced by the removed kernels.

At block 905, the CNN is retrained with updated filters.

Because filters have been removed, the CNN can be retrained to compensate for the absent filters. Because the removed filters have low impact on the image recognition task as indicated by the low magnitudes, the CNN can be retrained without the filters to regain the original accuracy of the trained CNN prior to pruning. Thus, a CNN may be pruned to reduce computation resources by removing convolutional operations associated with filter operations while not negatively impacting the accuracy of the CNN.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A system for predicting changes to an environment, the system comprising:
   a plurality of remote sensors, each remote sensor being configured to capture images of an environment, the remote sensors including an image capture device and being configured to be mounted to an autonomous vehicle;
   a storage device in communication with a processing device included on each of the remote sensors, the storage device including a pruned convolutional neural network (CNN) being trained to recognize obstacles according to images captured by the image capture device by training a CNN with a dataset, identifying filters from layers of the CNN that have kernel weight sums that are below a significance threshold for image recognition, removing the identified filters to produce the pruned CNN, and applying remaining filters to generate final feature maps for the pruned CNN, wherein the significance threshold is a number of smallest filters of a convolutional layer of the CNN according to corresponding absolute kernel weight sums,
   wherein the processing device is configured to recognize the obstacles by analyzing the images captured by the image capture device, and to predict movement of the obstacles and changes to the environment using the pruned CNN such that the autonomous vehicle automatically avoids the obstacles based on the predicted movement of the obstacles; and
   a transmitter configured to transmit the predicted movement of the obstacles and changes to the environment to a notification device such that an operator is alerted to the change.

2. The system of claim 1, wherein the processing device includes an embedded processing system.

3. The system of claim 1, wherein the processing device further includes a long short-term memory network configured to predict the change according to one or more of a plurality of recognized environmental features by the pruned CNN.

4. The system of claim 1, wherein the remote sensors include aerial drones.

5. The system of claim 1, wherein the change includes an environment hazard.

6. The system of claim 1, wherein the processing device is configured to prune filters from the pruned CNN according to one or more of a plurality of recognized environmental features.

7. The system of claim 1, wherein the remote sensing devices are battery powered.

8. A remote sensing device for predicting changes to an environment, the device comprising:
   a sensor configured to capture images of an environment, the remote sensor including an image capture device and being configured to be mounted to a vehicle;
   a storage device in communication with a processing device included on the remote sensor, the storage device including a pruned convolutional neural network (CNN) being trained to recognize environmental features according to images captured by the image capture device by training a CNN with a dataset, identifying filters from layers of the CNN that have kernel weight sums that are below a significance threshold for image recognition, removing the identified filters to produce the pruned CNN, and applying remaining filters to generate final feature maps for the pruned CNN, wherein the significance threshold is a number of smallest filters of a convolutional layer of the CNN according to corresponding absolute kernel weight sums,
   an embedded processing device configured to recognize the environmental features by analyzing the images captured by the image capture device, and to predict a change to the environmental features using the pruned CNN, the environmental features including obstacles in a road, such that the vehicle automatically avoids the obstacles based on the predicting the change to the environmental features, the predicting the change including predicting movement of the obstacles; and
   a transmitter configured to transmit the recognized environmental features and predicted changes to the environmental features to a notification device such that an operator is alerted to the change.

9. The system of claim 8, wherein the embedded processing device includes system-on-chip (SOC).

10. The system of claim 8, wherein the embedded processing device further includes a long short-term memory network configured to predict the change according to one or more of a plurality of recognized environmental features by the pruned CNN.

11. The system of claim 8, wherein the remote sensing device includes an aerial drone.

12. The system of claim 8, wherein the change includes an environmental hazard.

13. The system of claim 8, wherein the sensor is further configured to capture infrared images.

14. The system of claim 8, wherein the processing device is configured to prune filters from the pruned CNN according to one or more of a plurality of recognized environmental features.

15. The system of claim 8, wherein the pruned CNN is retrained upon pruning filters.

* * * * *